United States Patent
Mooney

(10) Patent No.: US 8,496,898 B2
(45) Date of Patent: Jul. 30, 2013

(54) FLUIDIZED BED CARBON DIOXIDE SCRUBBER FOR PNEUMATIC CONVEYING SYSTEM

(75) Inventor: Michael John Mooney, Lino Lakes, MN (US)

(73) Assignee: Nol-Tec Systems, Inc., Lino Lakes, MN (US)

( * ) Notice: Subject to any disclaimer, the term of this patent is extended or adjusted under 35 U.S.C. 154(b) by 212 days.

(21) Appl. No.: 13/023,569

(22) Filed: Feb. 9, 2011

(65) Prior Publication Data
US 2011/0206586 A1    Aug. 25, 2011

Related U.S. Application Data

(60) Provisional application No. 61/308,078, filed on Feb. 25, 2010.

(51) Int. Cl.
*B01D 53/12* (2006.01)
*B01D 53/62* (2006.01)
*B01J 8/18* (2006.01)

(52) U.S. Cl.
USPC ........... 423/230; 422/139; 422/143; 422/145; 422/147; 226/97.1; 222/152; 222/190

(58) Field of Classification Search
USPC .. 423/230; 422/139, 143, 145, 147; 226/97.1; 222/152, 190
See application file for complete search history.

(56) References Cited

U.S. PATENT DOCUMENTS

| | | | |
|---|---|---|---|
| 3,320,906 A | 5/1967 | Domahidy | |
| 3,767,765 A | 10/1973 | Gustavsson et al. | |
| 4,284,528 A * | 8/1981 | Lancet et al. | 502/411 |
| 4,411,879 A | 10/1983 | Ehrlich et al. | |
| 4,616,576 A | 10/1986 | Engstrom et al. | |
| 5,535,687 A | 7/1996 | Khanna | |
| 5,678,959 A | 10/1997 | Griffard et al. | |
| 5,878,677 A | 3/1999 | Muller et al. | |
| 6,125,655 A * | 10/2000 | Millet et al. | 62/641 |
| 6,200,543 B1 | 3/2001 | Allebach et al. | |
| 7,430,969 B2 | 10/2008 | Stowe, Jr. et al. | |
| 7,935,177 B2 * | 5/2011 | Lutz et al. | 95/129 |
| 8,273,160 B2 * | 9/2012 | Wright et al. | 96/4 |
| 2004/0250684 A1 * | 12/2004 | Krumdieck et al. | 96/290 |
| 2006/0005750 A1 | 1/2006 | Stowe, Jr. et al. | |
| 2006/0228281 A1 | 10/2006 | Stroder et al. | |
| 2007/0199448 A1 * | 8/2007 | Yates et al. | 95/139 |
| 2008/0127821 A1 * | 6/2008 | Noack et al. | 95/51 |
| 2009/0101050 A1 | 4/2009 | Lackner et al. | |
| 2011/0203174 A1 * | 8/2011 | Lackner | 47/58.1 R |

* cited by examiner

*Primary Examiner* — Timothy Vanoy
(74) *Attorney, Agent, or Firm* — John D. Veldhuis-Kroeze; Westman, Champlin & Kelly, P.A.

(57) ABSTRACT

A pneumatic conveying system for conveying hydrated lime is provided with ambient air for the pneumatic conveying system from a scrubber that removes carbon dioxide from the ambient air used in the conveying system. The scrubber includes a bed of hydrated lime through which ambient air is passed, to react carbon dioxide in the air with the hydrated lime in a reaction that forms limestone and water. The air that has passed through the fluidized bed, which is essentially carbon dioxide free, is also passed through a filter to remove particles suspended in the carbon dioxide free air. The carbon dioxide free air from the filter is provided to the pneumatic conveying system. The use of carbon dioxide free air ensures that the hydrated lime being transported in the conveying system will not react in the various conduits and ducts of the pneumatic conveying system to cause problems.

18 Claims, 5 Drawing Sheets

US 8,496,898 B2

FLUIDIZED BED CARBON DIOXIDE SCRUBBER FOR PNEUMATIC CONVEYING SYSTEM

CROSS-REFERENCE TO RELATED APPLICATION

This patent application refers to and claims priority of U.S. Provisional Application Ser. No. 61/308,078, filed Feb. 25, 2010, the content of which is incorporated by reference.

BACKGROUND OF THE DISCLOSURE

The present disclosure relates to a fluidized bed for removing carbon dioxide from atmospheric air that is used for conveying particulate materials in particular, dry particulate or powdered hydrated lime for injection into gas desulfurization systems.

It is known that dry hydrated lime can be used for removing sulfur dioxide ($SO_2$) and sulfur trioxide ($SO_3$) from flue gasses issuing from the boilers of fossil fuel burners. The mitigating of $SO_2$ and $SO_3$ emissions by injecting dry powdered hydrated lime sorbent directly into a utility duct work that is seeking to reduce emissions is done by pneumatic conveying systems that convey the hydrated lime to the flue gas ducts or passageways.

Using atmospheric air for the conveying fluid in the pneumatic conveying systems carrying hydrated lime has been found to be less than desirable because any carbon dioxide in the air will react with the hydrated lime (calcium hydroxide-$Ca(OH)_2$) and form calcium carbonate or limestone, ($CaCO_3$). The desirability of reducing carbon dioxide content in an airstream used for pneumatic conveying has been recognized, for example, in U.S. Pat. No. 6,200,543 as well as U.S. Pat. No. 5,678,959.

However, the ability to remove substantially all of the carbon dioxide from ambient air has been lacking in these systems, and it is desirable to have a self-contained, carbon dioxide scrubber for all of the air that is used for pneumatically conveying hydrated lime (calcium hydroxide) to a flue gas scrubbing system.

SUMMARY OF THE DISCLOSURE

The present disclosure relates to a pneumatic conveying system that includes a scrubber or device for removing carbon dioxide from the air that is used as the carrier fluid in the pneumatic conveying system to avoid problems arising when air containing carbon dioxide is used for conveying hydrated lime (calcium hydroxide). The present unit provides a fluidized bed containing hydrated lime (calcium hydroxide), through which the ambient air to be used for pneumatic conveying is passed, to permit the carbon dioxide in the air to react with the calcium hydroxide to form calcium carbonate or limestone, and water. This scrubbing action is completed before the air is passed through a filter for removing dust and particles. The filtered, carbon dioxide free air is directed to a compressor and/or blower used in the pneumatic conveying system.

The fluidized bed scrubber of this disclosure utilizes a membrane for supporting the hydrated lime material at a selected bed depth. New bed material is cycled through the scrubber from a silo that stores hydrated lime and the spent or reacted bed material is recycled back to the silo, or disposed of in a suitable manner. The filtered, $CO_2$ free air is then used for transporting hydrated lime to the flue gas treatment ducts, or other treatment conduits that are desired.

In the form shown, the depth of the fluidized bed and the amount of the scrubbing material in the scrubbing bed is maintained by using suitable feed mechanisms responsive to the total weight of the bed, so that a range of depth of the material used for scrubbing the ambient air can be controlled. In addition to the weight sensing that is shown in the disclosure, sensors to maintain the level of the bed at a selected level also can be utilized. The material in the scrubber forming the bed is then supplied on a continuing basis, generally in batches of material using suitable particulate material feeders. The material for the bed is introduced at one end of the scrubber, while at the other end a discharge outlet is provided to maintain a flow of the scrubbing material through the scrubber so that new scrubbing material is added to insure the bed has adequate and effective scrubbing properties. Gravity will normally be sufficient to move the bed material through the chamber, but if needed the bed can sloped slightly.

The pneumatic conveying systems used are conventional, as are the various valves, transporters and air locks used in the conveying systems.

DETAILED DESCRIPTION OF PREFERRED EMBODIMENTS

Figure 1:
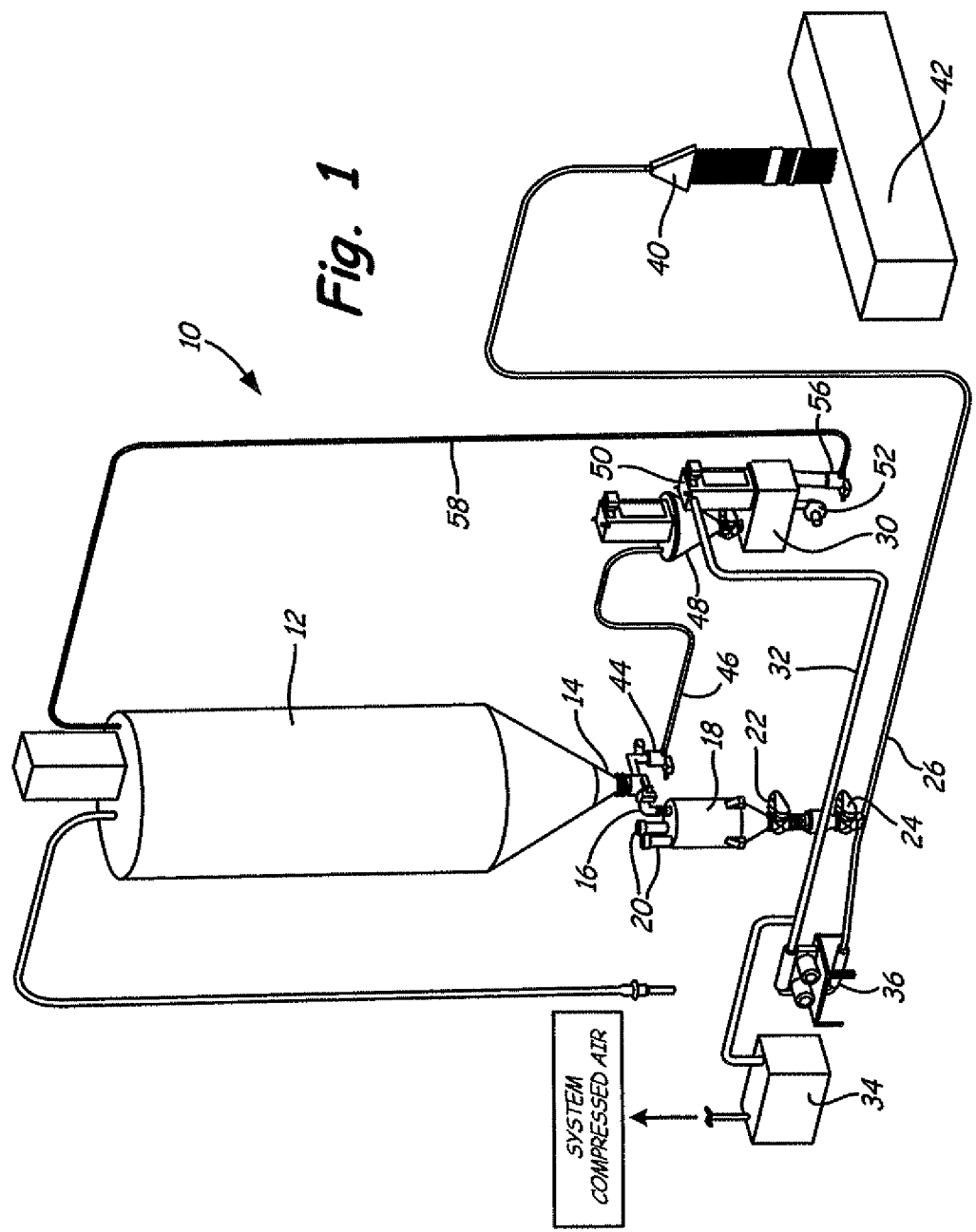
FIG. 1 is a schematic representation of a typical pneumatic conveying system for injecting dry particulate hydrated lime through a duct used in a scrubber system for scrubbing flue gases for example.

FIG. 1 shows a typical pneumatic conveying system indicated generally at 10 that is utilized for providing dry hydrated lime to a duct used in a flue gas scrubbing system, for example. The pneumatic conveying system 10 is provided with a dry particulate hydrated lime storage silo 12 of conventional design, that includes a conventional fluidizing bin bottom 14 used for dispensing material into a fluidizing conveying system. The bin bottom 14 is a valve type arrangement that will permit material in the bin to be discharged through a first conduit 16 and then through a weighing hopper 18 that is used for determining the amount of material being injected into a flue gas scrubbing system using dry hydrated lime. The weighing hopper 18 can have dust filters 20 in an upper end for permitting air to discharge and removing dust from such discharge. As shown includes two separate rotary air locks 22 and 24 are positioned to control the amount of material being fed into a line 26, to which the air lock 24 is connected. Line 26 leads to the hydrated lime injection system and is a pneumatic conveying line carrying hydrated lime in an airflow.

The air that is being provided for pneumatic conveying in the line 26 is passed through a carbon dioxide scrubber indicated generally at 30 in FIG. 1, and which will be explained in detail in connection with FIGS. 2-5. The air is treated in the scrubber 30 to remove carbon dioxide, and the carbon dioxide free air is provided along an air line outlet 32 from the scrubber to a system air compressor 34 and also to a blower 36, again of conventional design, which will provide an air flow from the line 32 through the blower 36 and into the line 26. The volume of air flowing through the line 26 is varied to suit the need. The hydrated lime from the silo 12 is fluidized and carried along the line 26 to a splitter assembly 40 that is connected to a duct 42 that carries gases to be treated with the hydrated lime, such as a flue gas.

In FIG. 1, the bin bottom 14 also delivers hydrated lime or calcium hydroxide ($CaOH_2$) to a transporter valve 44, also of conventional design, that will transport measured batches of the hydrated lime through a line 46 to an input receiving bin 48 that is connected to the scrubber 30. Bin bottom valve transporters, rotary air valves and the various components used in the pneumatic conveying system shown in FIG. 1 are conventional components available from Nol-Tec Systems, Inc., Lino Lakes, Minn., USA.

It should be noted that the scrubber 30 shown in FIG. 1 has a filter 50 at the scrubber outlet, so that the air carried in line 32 is not only carbon dioxide-free but it is also dust-free after having passed through the filter 50.

In FIG. 1, the scrubber 30 is provided with input ambient air from a fan shown schematically at 52, and also shown in FIG. 1 there is a transporter 56 connected to a material outlet of the scrubber 30. The transporter 56 that will move the spent or reacted bed material along a line 58 back into the silo 12.

The spent or reacted bed material that is discharged from the scrubber 30 into the transporter 56 includes calcium carbonate, which is an end product of the reaction of carbon dioxide and the hydrated lime (calcium hydroxide) as well as some unreacted hydrated lime. It should be noted that the reacted bed material, which would include limestone (calcium carbonate) and water mixed with unreacted hydrated lime, while illustrated as being returned to the bin or silo 12, can be disposed of in other ways.

Figure 2:
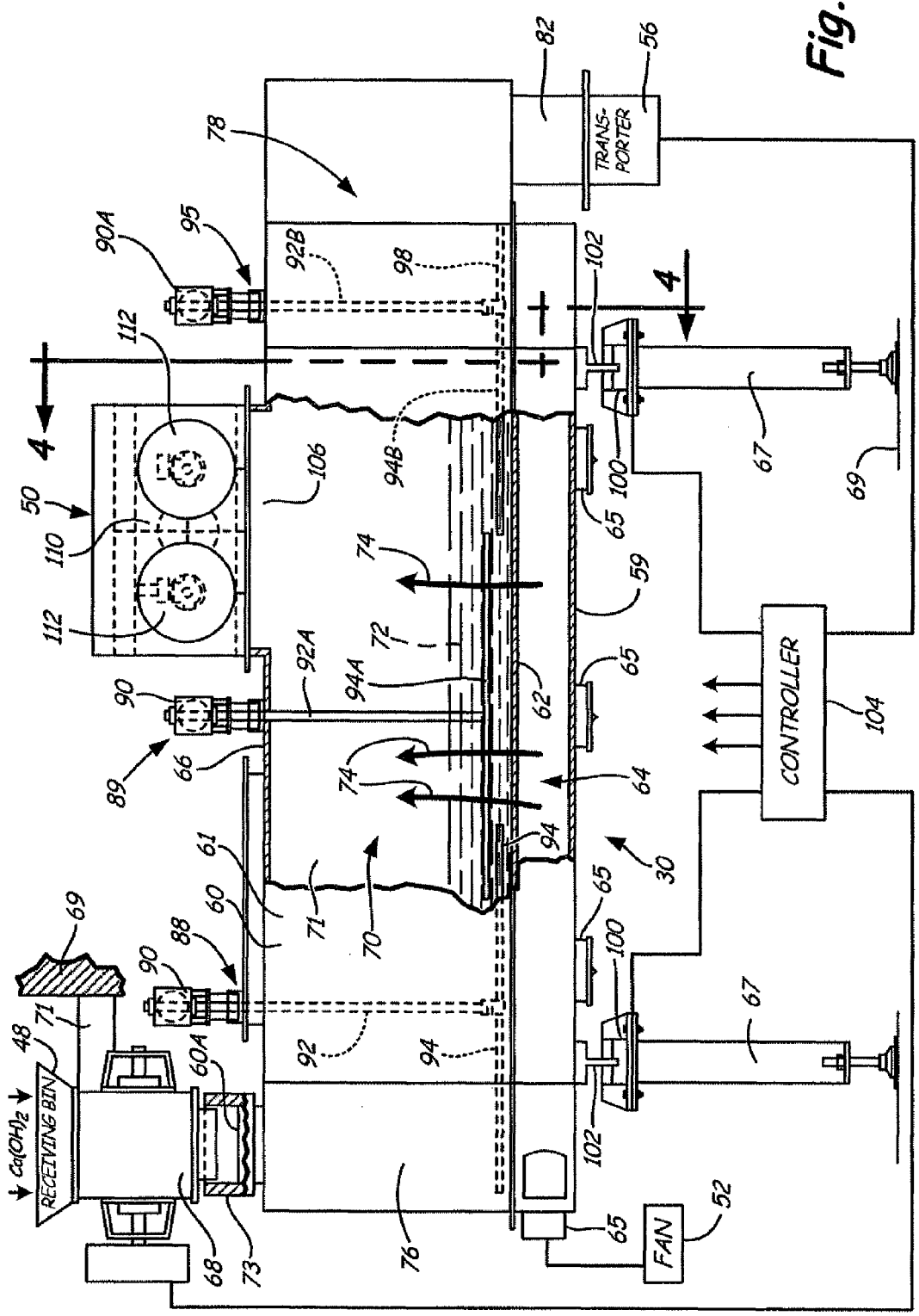
FIG. 2 is a side elevational view of a fluidized bed, carbon dioxide scrubber for removing carbon dioxide from ambient air.
Figure 3:
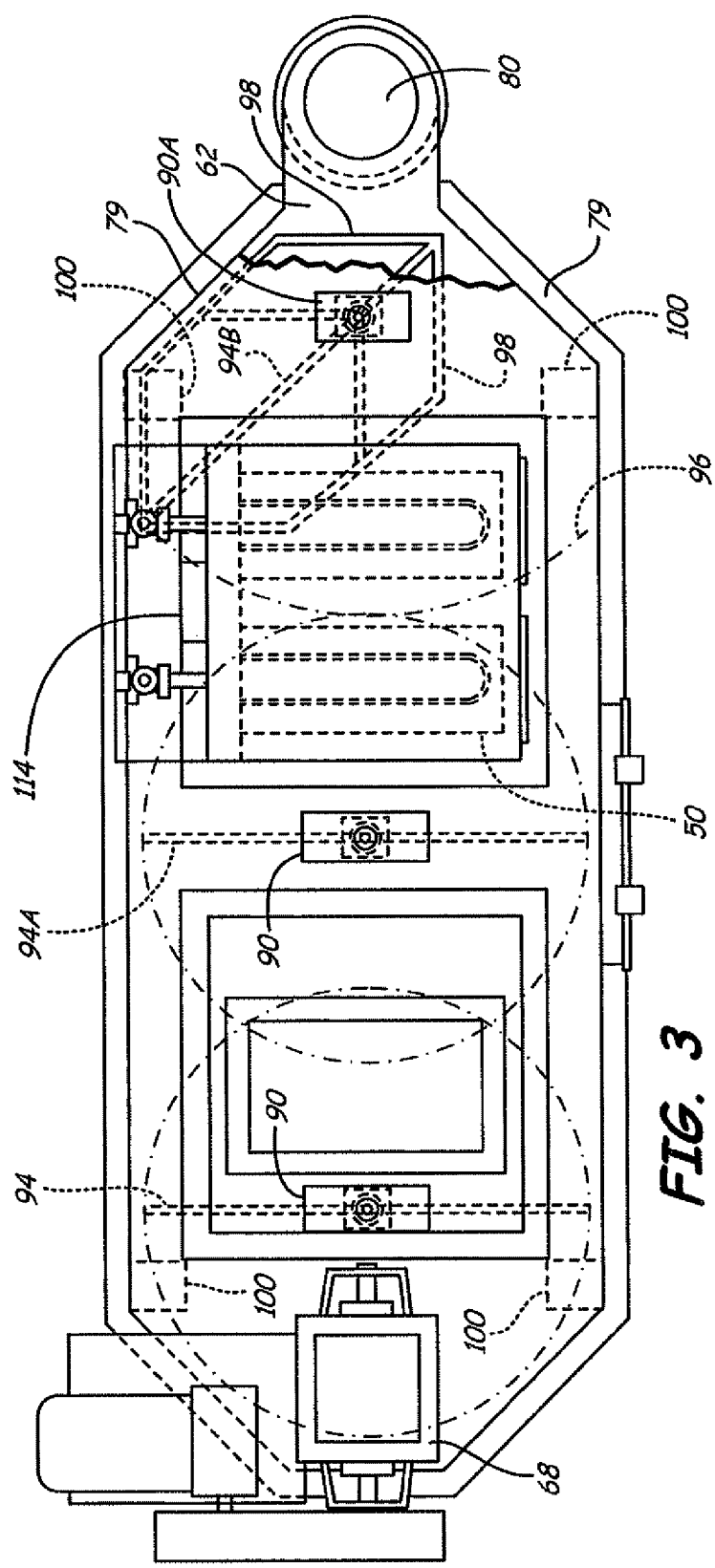
FIG. 3 is a top plan view of the scrubber of FIG. 2.
Figure 4:
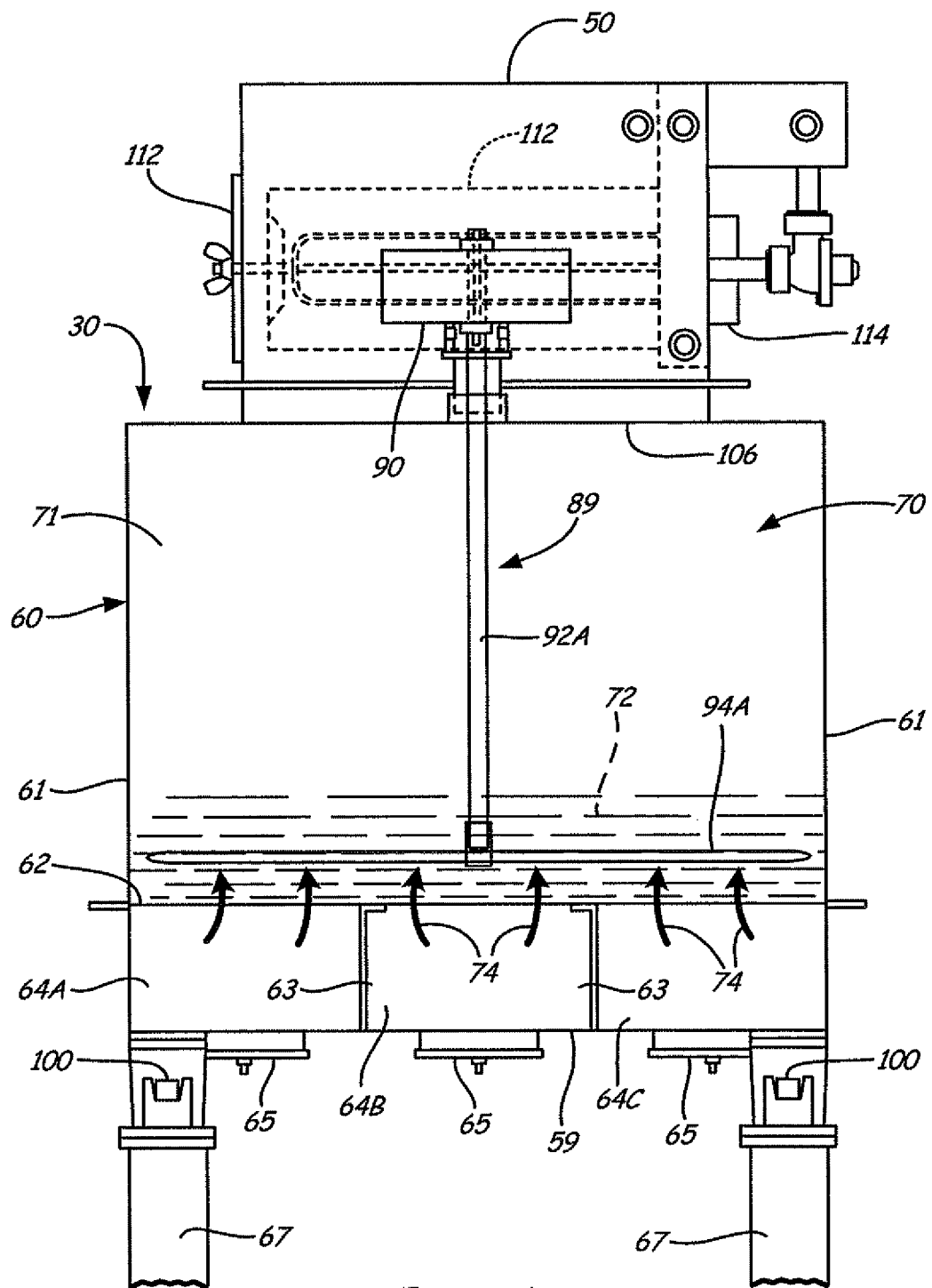
FIG. 4 is a sectional view of the scrubber taken on line 4-4 in FIG. 2.

In FIGS. 2, 3 and 4, the scrubber 30 is illustrated in detail. The scrubber includes a scrubber housing 60 that has side walls 61, a bottom wall 59 and ends 76 and 78. The housing 60 is supported on legs 67 on a support floor or structure 69. An air permeable membrane 62 is placed across the scrubber housing 60, near the bottom. The membrane 62 separates a plenum chamber 64 from an upper fluidized bed chamber 70. As shown in FIG. 4, there are dividers or longitudinal support walls 63 that are used to support the membrane 62 and separate the plenum chamber 64 into three longitudinal sections 64A, 64B and 64C.

The membrane 62 can be made of any suitable material that will permit the desired volume of air to pass through and not be adversely affected by hydrated lime. A woven polyester material, 5 mm thick, and available from Habasit America of Suwanee, Ga. is suitable.

The top wall 66 of the scrubber housing 60 has a connector sleeve 60A that forms an inlet into the fluidized bed chamber 70. A receiving bin 48 has a rotary air lock 68 at its outlet and the bin and air lock are independently supported with a support shown schematically at 71 on the floor or support structure 69. The support 71 can be separate legs or brackets that are not connected to the housing 60. The outlet of the air lock 68 is connected to the sleeve 60A with a flexible sleeve or bellows 73 to vibrationally isolate the receiving bin 48 and rotary air lock 68 from housing 60.

The hydrated lime introduced into the chamber 70 is supported on the membrane 62 to form a suitable bed 72 at a depth as illustrated by the dotted lines representing the fluidized bed through which ambient air passes as indicated by the arrows 74. As the air from the plenum 64 moves up through the bed 72, there is a reaction that removes carbon dioxide from the air. The bed 72 is a "flowing" bed that moves through the chamber 70 from the inlet end where the rotary air lock 68 drops the material in at end 76, to an outlet end 78, where there is a hydrated lime or bed material outlet port or opening 80 (FIG. 3), and a sleeve 82 is aligned with the opening 80. In FIG. 3, it can be seen that the side walls at outlet end 78 are tapered inwardly. The reacted material from the fluidized bed 72 will pass through the opening outlet 80 into sleeve 82 and then through the transporter 56 shown in FIG. 1 to a desired location.

The hydrated lime or calcium hydroxide reacts with the carbon dioxide in the air to form calcium carbonate (limestone) and water. The reaction is $Ca(OH)_2 + CO_2 \rightarrow CaCO_2 + H_2O$.

The plenum chamber sections 64A-64C are each connected with inlet connectors 65 to the fan 52 to generate a flow of air that is adequate and uniform enough for the pneumatic conveying system in which the scrubbed air, that is carbon dioxide free, is to be used.

In order to keep the bed 72 of dry hydrated lime fluid, and keep it consistently fluidized, a series of agitators are provided along the bed between the inlet and bed material outlet. First and second agitators 88 and 89 are provided near the inlet end and the center of the unit. The first agitator 88 is driven by an actuator or motor 90, and has an elongated shaft 92 that rotates a cross rod or paddle 94 that is immersed in the bed material to keep the material agitated. The second agitator 89 has an actuator or motor 90, and a somewhat shorter rod 92A that is connected to and rotates a cross rod or paddle 94A, that is raised up above the level of the cross rod 94, as can be seen in FIG. 2. The paths of the cross rods 94 and 94A overlap and keep the hydrated lime material in the bed 72 adequately agitated. A third agitator 95 is driven with an actuator or motor 90A, that drives a rod 92B that supports a paddle arrangement including a rod 94B and a frame 98, but in this case the actuator 90A is rotated only a selected number of degrees as indicated in FIG. 3 by the dashed, part circular line 96. The frame 98 rotates for a part of a rotation to keep the material along the tapered edges of the outlet end 78 suitably agitated. The outlet end 78 has inwardly tapering walls 79 which narrow down to guide reacted hydrated lime material to the opening 80. The reacted material will drop through the opening as the new hydrated lime is added at the inlet.

The level of the bed 72, which is preferably in the range of six inches above the membrane 62, is maintained by sensing the total weight of the calcium hydroxide or hydrated lime and reacted materials that are supported on the membrane through the use of load cells incorporated into the support legs 67. As shown, there are four support legs 67 and there are load cells 100 at the upper end of each of the support legs 67. The load cells are loaded from the housing 60 with suitable brackets 102 that are provided on the bottom wall 59 of the housing 60.

These load cells 100 provide weight signals, and the individual signals from each of the load cells can be analyzed in a controller 104 that includes a microprocessor, to determine if there is a need for additional inflow of the hydrated lime through the rotary air lock valve 68. Controller 104 is connected to the air lock valve 68 as well as the transporter 56, for controlling the amount of hydrated lime that is put into the bed and the amount of spent or reacted material that is removed from the scrubber housing.

Additionally, the controllers 104 will be used for operating the individual agitator actuators 90 and 90A, as well as controlling the blowers and fans, and in general will provide controls to the various components such as the valves 22, 24, the transporter 44, the bin bottom 14 and fan 52.

The controller 104 can be an overall system controller, therefore, of the entire pneumatic conveying system, including the fluidized bed scrubber 30. The controller can be programmed to perform the desired functions.

A portion of chamber 70 above the fluidized bed 72 which is indicated at 71 forms a scrubbed air discharge chamber and has an air outlet opening 106 at the upper side of the housing 60, and the pressurized plenum 64 causes the air that passes through the bed 72 to move into the discharge chamber 71 and then out through the outlet opening 106 and through a suitable dust filter 50 that includes removable filter cartridges shown at 112 (FIGS. 3 and 4), and which will separate out particles of calcium carbonate and other particles such as stray calcium hydroxide particles from the air. The outlet from the filter 50 can be at the end of the filter housing, as shown at 114 in FIGS. 3 and 4. The outlet conduit or ducts represented in FIG. 1 at 32 would be of suitable size to avoid excessive back pressure at the filter 50. The filters are well known and can be selected to provide adequate flow, and filter media can be selected to eliminate particles above a selected size.

Figure 5:
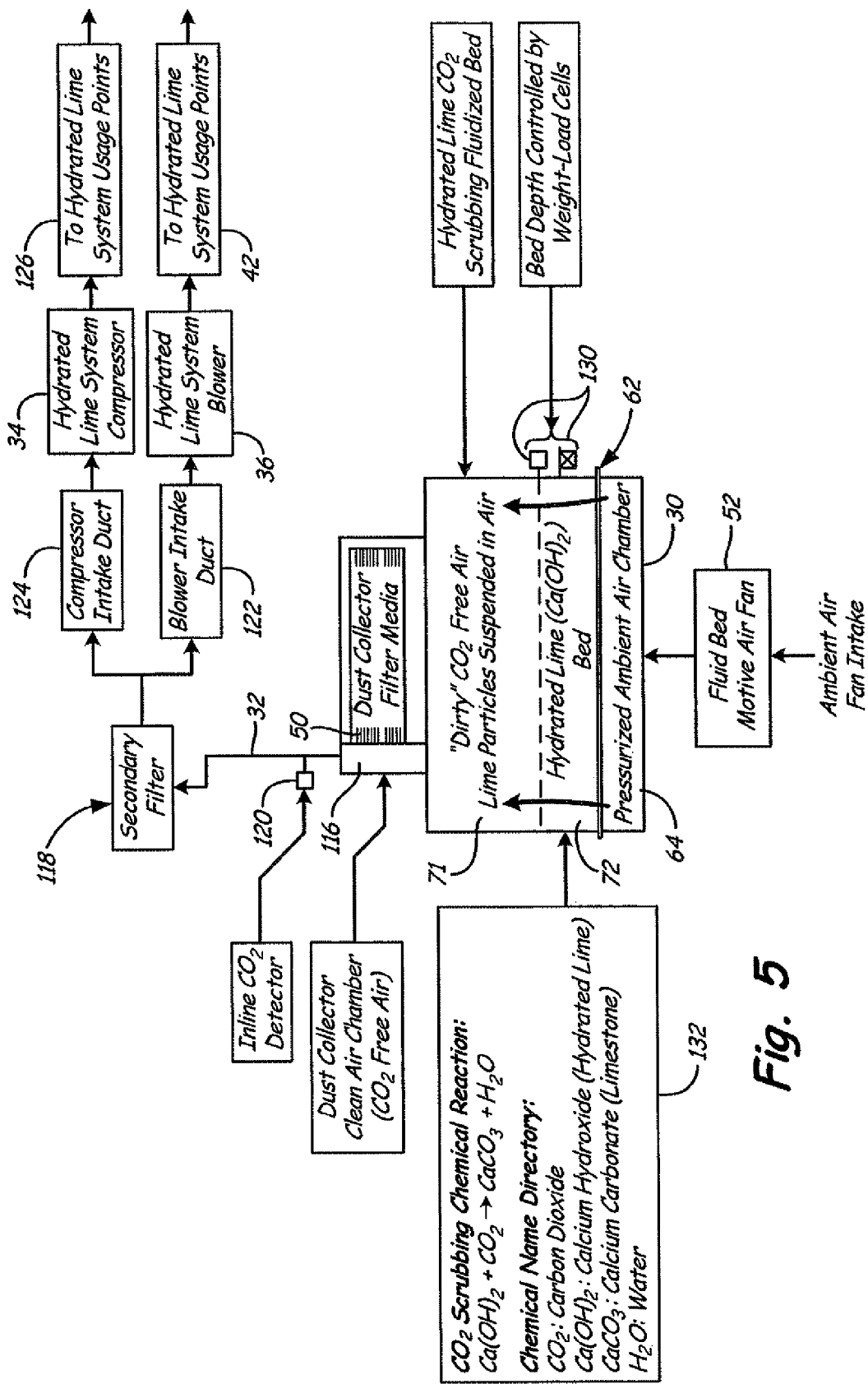
FIG. 5 is a schematic representation of the scrubber schematically showing components used for removing carbon dioxide from conveying air used in a pneumatic conveying system.

FIG. 5 is a schematic representation of the process for removing carbon dioxide from the air that is used in pneumatic conveying system. The representations are schematic but the scrubber is indicated at 30, and the pressurized ambient air chamber or plenum 64 is represented below the membrane 62. The hydrated lime or calcium hydroxide bed is indicated there as well at 72, with the discharge chamber 71 above the bed of hydrated lime.

A dust collector or filter 50 is represented as well. After the air has passed through the dust collector filter media of filter 50, it can enter into a clean air chamber shown schematically at 116, that corresponds to outlet 114, and then conduit 32 carries carbon dioxide free air to a secondary filter 118 that can be utilized in the line if desired, to insure that the air is free of particles. An in-line carbon dioxide detector 120 may be provided for monitoring the efficiency and operation of the bed, so that the controller 104 can adjust the feed rate to increase the depth of the bed or regulate it in a manner to enhance the process and ensure fully scrubbed or carbon dioxide free air in the duct 32.

After passing through the secondary filter 118, the carbon dioxide free air is transferred to the blower intake ducts 122 for the blower 36, and then used, in the example shown, to pneumatically convey hydrated lime at a hydrated lime system usage point. That would be similar to the duct 42.

Part of the carbon dioxide free air also can be passed through a compressor intake duct 124 to the hydrated lime system compressor 34 that can provide air under pressure to various hydrated lime system usage points indicated at 126 in FIG. 5.

As illustrated in FIG. 5, the fluid bed air fan 52 receives ambient air, and delivers it to the pressurized plenum or chamber 64 of the scrubber 30.

Also, the depth of the fluidized bed of hydrated lime can be controlled by weight using the load cells shown as well as other sensors and controls. High and low bed levels are represented at 130 to schematically show a range of depths.

In FIG. 5, the carbon dioxide scrubbing chemical reaction is represented in the block 132, as it takes place as the air is passed through the fluidized bed 72. The reaction is: $Ca(OH)_2 + CO_2 \rightarrow CaCO_2 + H_2O$. Block 132 shows that the reaction taking place in the bed will remove the carbon dioxide from the air forming calcium carbonate, or limestone, plus water.

The rate of ambient air inflow is selected, and the depth of the bed is selected so that there is adequate interaction between the air passing through the fluidized bed and the bed of hydrated lime to cause all of the carbon dioxide in the air to react as shown to form calcium carbonate and water. The bed depth can be regulated to ensure complete removal of the carbon dioxide.

The overall size of the scrubber 30 can be regulated as well to ensure that the volume of air needed for the pneumatic conveying system that will be conveying calcium hydroxide in a flue gas scrubber system, for example, will be adequate, and the conveying air will be fully scrubbed or carbon dioxide free when used.

Although the present invention has been described with reference to preferred embodiments, workers skilled in the art will recognize that changes may be made in form and detail without departing from the spirit and scope of the invention.

What is claimed is:

1. A fluidized bed for removing carbon dioxide from ambient air comprising a housing, an air permeable membrane dividing the housing into an air plenum and a discharge chamber, a bed of hydrated lime supported on the air permeable membrane in the discharge chamber, a source of ambient air connected to the air plenum to provide an air flow through the air permeable membrane and the bed of hydrated lime into the discharge chamber, the bed of hydrated lime causing a reaction with carbon dioxide in the ambient air passing through the air permeable membrane and the bed of hydrated lime to react the carbon dioxide with the hydrated lime, a filter connected to an outlet from the discharge chamber at a location above the bed of hydrated lime for filtering suspended particles in air exiting the discharge chamber.

2. The fluidized bed of claim 1 further comprising sensors for sensing the amount of hydrated lime supported on the air permeable membrane.

3. The fluidized bed of claim 1, wherein the housing has spaced side walls and a bottom wall, and wherein the air permeable membrane is supported in position above the bottom wall of the housing, and at least one support wall between side walls of the housing underlying and supporting the air permeable membrane.

4. The fluidized bed of claim 1 including an inlet valve connected to the housing at an end thereof for providing hydrated lime to be supported on the air permeable membrane to form the bed of hydrated lime, and an outlet at an opposite end of the housing from the inlet valve for discharging material forming the bed.

5. The fluidized bed of claim 1 and a first valve providing hydrated lime to the discharge chamber to control material introduced into the housing, and a second valve at a hydrated lime outlet of the housing for controlling the amount of hydrated lime discharged from the housing.

6. The fluidized bed of claim 1 and a clean air outlet conduit connected to an outlet of the filter, a blower connected to the clean air conduit, and an output of the blower being connected into a pneumatic conveying system for conveying hydrated lime using the air from the clean air outlet conduit.

7. The fluidized bed of claim 1 wherein the air permeable membrane is supported at least one longitudinally extending divider, the divider separating a space covered by the air permeable membrane into plenum sections.

8. The fluidized bed of claim 1 and at least one agitator supported on the housing and operable to agitate hydrated lime supported on the air permeable membrane.

9. The fluidized bed of claim 8 wherein the at least one agitator comprises a rotating bar immersed in the hydrated lime forming the bed, and an actuator to rotate the rotating bar.

10. A pneumatic conveying system for conveying hydrated lime in a conduit comprising a source of hydrated lime, a connection from the source of hydrated lime to the conduit, a blower for providing air under pressure connected to the conduit for pneumatically conveying hydrated lime in the conduit, and an air scrubber for removing carbon dioxide from the ambient air provided to the blower, said scrubber comprising a fluidized bed of hydrated lime through which ambient air passes to a discharge chamber, a filter for filtering air from the discharge chamber, and a separate conduit connected from an outlet of the filter to an input of the blower.

11. The pneumatic conveying system of claim 10 wherein said air scrubber has a housing, an inlet to said housing for hydrated lime to form the fluidized bed, said inlet to said housing being coupled to the source of hydrated lime, and a controllable transporter for introducing hydrated lime into the housing to form the fluidized bed.

12. The pneumatic conveying system of claim 11 and a material outlet from the housing to discharge hydrated lime forming the fluidized bed after ambient air has passed through the hydrated lime forming the bed.

13. The pneumatic conveyor system of claim 12 wherein the material outlet is connected to the source of hydrated lime to return the hydrated lime forming the bed to said source.

14. The pneumatic conveying system of claim 12 wherein the inlet to the housing includes a first valve and the outlet includes a second valve, sensors to sense the amount of hydrated lime forming the fluidized bed, and to provide signals that are a function of such amount, and a controller connected to the first and second valves to control the first and second valves in response to signals provided by the sensors.

15. A method of providing fluidizing air for a conduit of a pneumatic conveying system transporting hydrated lime comprising, providing a source of hydrated lime, providing a housing having an air permeable membrane, connecting the source of hydrated lime to the housing and forming a fluidized bed of hydrated lime supported on the air permeable membrane, passing ambient air through the fluidized bed of hydrated lime and thereby removing carbon dioxide from the ambient air, and providing air that has passed through the fluidized bed of hydrated lime to the conduit for fluidizing and transporting hydrated lime through the conduit.

16. The method of claim 15 including filtering the air that has passed through the fluidized bed of hydrated lime before providing such air to the conduit.

17. The method of claim 16 including regulating the depth of the fluidized bed of hydrated lime on the air permeable membrane.

18. The method of claim 15 including supporting the air permeable membrane above a bottom wall of the housing to form a plenum chamber for receiving ambient air that is passed through the fluidized bed of hydrated lime.

\* \* \* \* \*